United States Patent [19]

Rechter

[11] 4,210,454
[45] Jul. 1, 1980

[54] ALUMINOUS REFRACTORY COMPOSITIONS CONTAINING CARBON, SILICON AND CHROME OXIDE

[75] Inventor: Harold L. Rechter, Country Club Hills, Ill.

[73] Assignee: Chicago Fire Brick Company, Chicago, Ill.

[21] Appl. No.: 17,270

[22] Filed: Mar. 5, 1979

[51] Int. Cl.$^2$ .............................................. C04B 35/52
[52] U.S. Cl. ...................................... 106/56; 106/65; 106/66
[58] Field of Search ............................... 106/56, 65, 66

[56] References Cited

U.S. PATENT DOCUMENTS

| | | | |
|---|---|---|---|
| 3,810,768 | 5/1974 | Parsons et al. ............... | 106/56 |
| 3,842,760 | 10/1974 | Parsons et al. ............... | 106/56 |
| 3,846,144 | 11/1974 | Parsons et al. ............... | 106/56 |
| 3,888,687 | 6/1975 | Manigauht .................... | 106/66 |
| 3,923,531 | 12/1975 | Parsons et al. ............... | 106/56 |
| 3,948,670 | 4/1976 | Manigault .................... | 106/66 |
| 4,066,467 | 1/1978 | Rechter ....................... | 106/56 |

*Primary Examiner*—James Poer
*Attorney, Agent, or Firm*—Foster York

[57] ABSTRACT

A composition blending carbon or graphite with powdered chromium oxide in a high alumina matrix, including silicon metal powder to inhibit carbon oxidation, is more advantageous in resisting molten iron and slags than refractories based on carbon or chrome additions not combined. The resultant refractory mixes are suitable for all conventional application methods.

10 Claims, No Drawings

ALUMINOUS REFRACTORY COMPOSITIONS CONTAINING CARBON, SILICON AND CHROME OXIDE

BACKGROUND OF THE INVENTION

1. Field of the Invention

The invention relates to an improvement in aluminous refractory compositions containing carbon and silicon, the term carbon including amorphous carbon and graphite.

2. Description of the Prior Art

The excellent ability of aluminous refractories containing carbon to withstand erosion by molten iron and slag is well known and such materials are commonly used to advantage in iron-making foundry and blast furnace facilities, particularly in tap hole and iron and slag spout areas.

The usual carbon refractory materials exhibit the disadvantage of rapid oxidation at temperatures above 900° F. limiting their working life. U.S. Pat. Nos. 3,810,768; 3,846,144; 3,842,760 and 3,923,531, in which applicant is one of the inventors, disclose the combination of powdered silicon metal with carbon along with aluminous refractory material to inhibit oxidation and improve mechanical properties. These carbon refractories also exhibit slag resistance, but their slag resistance is limited by the fact that increasing the carbon content increases oxidation so that there is a practical limit to the amount of carbon that may be used in the composition, generally less than 50% and usually not substantially higher than 35% by weight.

High alumina-chromic oxide compositions are disclosed in Manigault U.S. Pat. Nos. 3,888,687 and 3,948,670. These compositions do not contain carbon in the form of graphite or otherwise. There is no disclosure of the value of chromic oxide in increasing slag resistance and it is believed that such compositions without carbon are relatively ineffective in improving resistance against contact with basic slag compounds.

It is an object of my invention to obtain improved slag resistance without excessive high carbon content in aluminous-carbon refractory compositions.

SUMMARY OF THE INVENTION

I have found that the addition of chromic oxide to an aluminous refractory composition containing carbon and silicon is more advantageous in resisting molten iron and slags, especially basic slags, than refractories based on carbon or chrome additions not combined.

DETAILED DESCRIPTION AND PREFERRED EMBODIMENTS

Preferably the aluminous aggregate is alumina or aluminum silicate aggregate containing at least 60% of $Al_2O_3$.

Although tabular alumina and calcined alumina can be used the composition is effective with lower cost bauxite aggregates.

The carbon may be in the form of graphite or ordinary (amorphous) carbon.

The chrome oxide is preferably of pigment grade, for example −325 mesh, or micronized chrome oxide. However, any powdered chrome oxide may be used, including chrome oxide refractory grains ground to −10 mesh.

The chromic oxide is preferably present in 5-15% by weight, carbon from 9-35%, and silicon in amount to substantially inhibit oxidation of the carbon, and aluminous material approximately 40-80% by weight.

Also, there may be included in the composition clays useful for workability, green binders for pre-fired strength, coal tar pitch for reduced penetrability, and high alumina fines for the most advantageous matrix. The refractory products made according to this description may be in the form of ramming plastics, drier granular ramming mixes, castables, gunning mixes, hand patching plastics, and vibration placement mixes.

The method of application determines grain sizing, water content, and type and amount of clay addition.

Our range of formulation can be summarized as follows:

|  | % by weight |
| --- | --- |
| High alumina aggregate | 42-52 |
| High alumina fines | 0-12 |
| Carbon or graphite | 9-35 |
| Silicon metal powder | 5-15 |
| Chromic oxide | 5-15 |
| Ball clays | 0-12 |
| Bentonite | 0-8 |
| Coal tar pitch | 0-10 |
| Green binders | 0-7 |
| High alumina cement | 0-25 |
| Phosphoric acid (75%) | 0-8 |

The high alumina aggregate is preferably calcined South American bauxite, ⅜ inch maximum sizing, graded to over 90% on a 35 mesh screen. For patching compounds a maximum size of 1/16 to ⅛ inch is preferred. Tabular and fused alumina aggregates can be used, as well as calcined bauxitic kaolins containing 70% alumina. Lower alumina content aggregates will reduce slag effectiveness. High alumina fines should have at least 60% alumina content, preferably pure calcined alumina, and grain sizing of minus 200 mesh, preferably minus 325 mesh. About 7-10% is useful in plastics and ramming mixes, but none is required in gunning mixes. Kyanite (60% alumina) can be used as fines.

Carbon and graphite additions do not have to be pure, with ash contents of 20% performing acceptably. Grain sizing can vary from a ¼ inch maximum down, as preferred for the application. In some cases a minus 30 mesh graphite is used. Silicon metal powder preferably should be sunstantially minus 20 mesh, and the finer the better. Chromium oxide is preferably selected from pure pigment grades, and is preferably sub micron or minus 325 mesh.

Clay or other binder contents can vary widely depending on method or application. For ramming mixes, including plastics, combinations of plastic ball clays and Western bentonites should range from 7 to 10%. Castables and vibrating mixes may contain no clay. If coal tar pitch is required, about 5% is preferred. Green binders include lignosulfonates and aluminum sulfate, and are generally used at levels of about 3% of active material. Phosphoric acid binders of concentrations other than 75% would be adjusted accordingly. For castables and gunning mixes calcium aluminate cements are included for bonding.

Further additions, such as for additional shelf life to formulations with phosphoric acid (e.g. citric and oxalic acids) or wetting agents, are not precluded by the suggested compositional ranges.

Water is also added in most cases, and may vary from about 12% for patching mixes, 10% for plastics, 5% for granular ramming mixes, 3% for prewetted gunning mixes, to dry for castables and gunning mixes with high alumina cements.

The following examples are provided to show the range of products intended by this invention:

EXAMPLE 1

A ramming plastic formulation was prepared as follows:

|  | % by weight |
| --- | --- |
| Calcined bauxite (¼' by downs) | 47 |
| −325 mesh calcined alumina | 9 |
| −30 mesh Mexican graphite | 12 |
| Pelletized coal tar pitch | 5 |
| Plastic ball clay | 2 |
| Western bentonite | 6 |
| Silicon metal powder | 8 |
| Chromium oxide | 8 |
| Aluminum sulfate | 3 |

Water was added to give a final moisture content of 10%. This product has been manufactured by extrusion and slicing, placed into cartons, and has performed remarkably well against foundry slags or a wide variety of basicities.

EXAMPLE 2

A granular ramming mix was prepared as follows:

|  | % by weight |
| --- | --- |
| Calcined bauxite (¼' by downs) | 51 |
| −325 mesh calcined alumina | 8 |
| Mexican graphite (¼' by downs) | 11 |
| Plastic ball clay | 8½ |
| Silicon metal powder | 6½ |
| Chromium oxide | 8½ |
| Phosphoric acid (75%) | 6½ |

Water was added to give a final moisture level of 6%. An addition of approximately 0.25% of citric acid can provide extended working life, particularly in warm environments.

EXAMPLE 3

A gunning mix was formulated as follows:

|  | % by weight |
| --- | --- |
| Calcined bauxite (¼' by downs) | 54 |
| Chromium oxide | 8½ |
| Silicon metal powder | 6 |
| Calcium aluminate cement (>70% Al₂O₃) | 8½ |
| Mexican graphite (¼' by downs) | 12½ |
| Western bentonite | 2 |
| −100 mesh kyanite | 8½ |

This material is bagged dry, but can be prewetted with 3% water addition just prior to gunning.

EXAMPLE 4

A product formulated for placement by vibration in a form, which can then be stripped for heating the lining so that it can soon be placed in service, is the following:

|  | % by weight |
| --- | --- |
| Calcined bauxite (¼' by downs) | 38.8 |
| −325 mesh calcined alumina | 7.8 |
| Graphite (¼' by 30 mesh) | 9.7 |
| Graphite (−30 mesh) | 9.7 |
| −35 mesh kyanite | 7.8 |
| Powdered silicon metal | 9.7 |
| Pelletized coal tar pitch | 5.8 |
| Chromic oxide | 7.8 |
| Lignosulfonate water suspension | 2.9 |

This material can be used at total water levels of 4½–6%, providing a trade-off on ease of vibration vs. tendency to slump on removal of forms.

In the specification and claims the term "high alumina" refers to an alumina-containing composition containing at least 60% by weight alumina.

All percentages are in weight percent.

I claim:

1. In a refractory composition comprising alumina or aluminum silicate refractory material, carbon and powdered silicon, the improvement of having chromic oxide and carbon present in the composition in amount sufficient to give greater resistance to slag over that of aluminous composition in which chromic oxide and carbon are absent.

2. The refractory composition of claim 1 wherein the carbon is present 9–35%, the chromic oxide is present in 5–15%, and the silicon is present in amount sufficient to inhibit oxidation of the carbon.

3. The composition of claim 1 wherein the carbon is graphite.

4. The composition of claim 1 wherein the aluminous material comprises an alumina aggregate containing at least 60% alumina.

5. A refractory composition comprising

|  | % by weight |
| --- | --- |
| High alumina aggregate | 42–52 |
| High alumina fines 200 mesh | 0–12 |
| Carbon or graphite | 9–35 |
| Silicon metal powder | 5–15 |
| Chromic oxide | 5–15 |
| Ball clays | 0–12 |
| Bentonite | 0–8 |
| Coal tar pitch | 0–10 |
| Green binders | 0–7 |
| High alumina cement | 0–25 |
| Phosphoric acid (75%) | 0–8 |

6. The refractory composition of claim 1 wherein the said composition is a plastic suitable as a ramming mix and comprises calcined bauxite, coal tar pitch, clay and aluminum sulfate.

7. The refractory composition of claim 1 wherein the said composition is a gunning mix and the composition comprises calcined bauxite, calcium aluminate cement, kyanite and bentonite.

8. The refractory composition of claim 1 wherein the said composition is suitable for vibration placement and the composition comprises calcined bauxite, kyanite and coal tar pitch.

9. The refractory composition of claim 1 wherein the composition is a granular ramming mix and the composition comprises calcined bauxite, phosphoric acid and clay.

10. The refractory composition of claim 1 wherein the said composition comprises alumina in the form of calcined bauxite.

* * * * *